US008641425B2

(12) United States Patent
Chandler

(10) Patent No.: US 8,641,425 B2
(45) Date of Patent: Feb. 4, 2014

(54) SYSTEM AND METHOD FOR CORRELATING CURRICULA

(76) Inventor: Gregg Alan Chandler, St. Joseph, MI (US)

( * ) Notice: Subject to any disclaimer, the term of this patent is extended or adjusted under 35 U.S.C. 154(b) by 322 days.

(21) Appl. No.: 12/804,530

(22) Filed: Jul. 23, 2010

(65) Prior Publication Data

US 2010/0291531 A1 Nov. 18, 2010

Related U.S. Application Data

(63) Continuation-in-part of application No. 12/317,599, filed on Dec. 26, 2008.

(60) Provisional application No. 61/018,127, filed on Dec. 31, 2007.

(51) Int. Cl.
*G09B 7/00* (2006.01)

(52) U.S. Cl.
USPC .......... 434/323

(58) Field of Classification Search
USPC .......... 434/322, 323, 433
See application file for complete search history.

(56) References Cited

U.S. PATENT DOCUMENTS 6,507,726 B1 * 1/2003 Atkinson et al. .......... 434/350
2002/0102524 A1 * 8/2002 Rizzi et al. .......... 434/350
2002/0178038 A1 * 11/2002 Grybas .......... 705/7
2003/0017442 A1 * 1/2003 Tudor et al. .......... 434/322
2003/0050935 A1 * 3/2003 Spetsmann .......... 707/104.1
2003/0064354 A1 * 4/2003 Lewis .......... 434/322
2003/0110215 A1 * 6/2003 Joao .......... 709/203
2003/0113697 A1 * 6/2003 Plescia .......... 434/322
2004/0157201 A1 * 8/2004 Hollingsworth et al. .......... 434/350
2006/0105315 A1 * 5/2006 Shaver .......... 434/362
2006/0252021 A1 * 11/2006 Watkins et al. .......... 434/350
2009/0017435 A1 * 1/2009 Simmons .......... 434/362

OTHER PUBLICATIONS

"CTESTAR User Manual" Enthusiastic Software (2006) pp. 1-174.

* cited by examiner

*Primary Examiner* — Kesha Frisby
(74) *Attorney, Agent, or Firm* — Flynn, Thiel, Boutell & Tanis, P.C.

(57) ABSTRACT

A system and method for correlating learning objectives, curriculum items or elements or competency expectations between multiple curricula, or between a curriculum and established national, industry or governmental standards, includes multiple steps. A first curriculum, including multiple curriculum items, is selected. A second curriculum or standard, containing multiple elements, is selected. A curriculum item from within the first curriculum is selected. A filter is applied to the elements of the second curriculum or standard to produce a visible display of a subset of elements from within the second curriculum. Individual elements, from within the subset of elements, are identified as correlating to the curriculum item. The individual elements that correlate to the curriculum item are tagged, or cross-walked, to create a link between the curricula. Such correlations may also extend to achievements of an individual student or to a set of students.

16 Claims, 14 Drawing Sheets

Second Curriculum or Standard Set

| | First Item 1 | Second Item 2 | Third Item 3 | Fourth Item 4 | Fifth Item 5 | ... |
|---|---|---|---|---|---|---|
| First Item A | | X | | | | |
| Second Item B | X | | X | | | |
| Third Item C | | | X | | | |
| Fourth Item D | | | | | X | |
| Fifth Item E | | | | X | | |
| ... | | | | | | |

First Curriculum or Standard Set

FIG. 1 (PRIOR ART)

Hospitality and Culinary Arts,

| Student | Subject | Count | Avg | StdDev |
|---|---|---|---|---|
| Allen, Leslie J. | Bio | 62 | 86 | 7 |
| Carlson, William W. | Bio | 62 | 77 | 7 |
| Cooper, Patsy A. | Bio | 62 | 89 | 7 |
| Driscoll, Ted S. | Bio | 62 | 84 | 8 |
| Eagon, Roger H. | Bio | 62 | 81 | 8 |
| . | . | . | . | . |
| . | . | . | . | . |
| . | . | . | . | . |
| Williams, Stephen H. | Bio | 62 | 84 | 9 |
| Young, Peggy H. | Bio | 0 | 0 | 0 |
| Zachery, Samuel H. | Bio | 57 | 81 | 11 |

Student

Academic Discipline

Summary Score Calculations for Discipline

FIG. 10

SYSTEM AND METHOD FOR CORRELATING CURRICULA

CROSS-REFERENCE TO RELATED APPLICATIONS

This application is a continuation-in-part of U.S. application Ser. No. 12/317,599, filed Dec. 26, 2008, which claims the benefit of U.S. Provisional Application No. 61/018,127, filed Dec. 31, 2007, hereby incorporated herein by reference.

FIELD OF THE INVENTION

The invention relates to a system and method for correlating learning objectives or competency expectations between multiple curricula and between a curriculum and established national, industry or government standards, in particular a practice known as a curriculum "cross-walk".

BACKGROUND OF THE INVENTION

It is often necessary to document the correspondence between two differing curriculums, or between a curriculum and a set of standards. This process is generally referred to as "cross-walking" a curriculum, although many other terms such as curriculum analysis, gap analysis, et al., are also used.

In the present discussion, the term "curriculum" or "curricula" can be taken to include any set of educational standards, items in a course, or other terms used to describe the content or materials contained in a course. The goal is to establish a correspondence between the items in the two curricula, or between a curriculum and a set of standards such as a curriculum framework.

By way of example, the purpose might be to demonstrate that one method of teaching the material accomplishes the same goals as another, to establish equivalency of courses between institutions. In the alternative, it might be necessary to document a correspondence between a curriculum and a set of standards to justify additional governmental funding for a course. The curriculum cross-walk can also be used to demonstrate that the curriculum of a text book covers all of the mandated course material for a curriculum, or set of standards. It is thereby possible to demonstrate that a different curriculum addresses the same material as the alternative curriculum or as required by the set of standards.

The process of establishing this correspondence between the two curricula, or of establishing a correspondence of a curriculum to standards, is labor intensive. It is tedious to establish all of the relationships between the two sets of items.

One can envision the process of cross-walking two curricula, or a curriculum to a set of standards, as a large matrix. There is a row for each item in the first curriculum, and a column for each item in the second curriculum or standards, as illustrated in FIG. 1. The process of determining a correspondence between one or more items can be likened to putting an "x" at the intersection of the respective row and column to establish the correspondence of the two curriculum items. In this way, an item from the first curriculum can be identified as corresponding to one or any number of items in the second curriculum. Similarly, any item in the second curriculum or standard can be identified as corresponding to any number of items from the first curriculum. To thoroughly "cross-walk" the two curricula, it is necessary to traverse the entire matrix, considering all possible combinations of rows and columns to determine which items from the first curriculum correspond to items from the second curriculum and vice versa.

This process has been made more manageable by the creation of computer software which presents the curriculum items in list form for review and selection by the user, as shown in FIG. 2. For example, previous versions of CTESTAR®, available from Enthusiastic Software of Benton Harbor, Mich., and commonly owned with the present application, automate the process in this manner.

The problem with the matrix approach, and its corresponding list, is that the number of combinations of items from the two sets grows as a product of the number of line items in each curriculum or set of standards. If the first curriculum has 100 items, and the second has 75 items, the number of considerations that must be done is 75 times 100, or 7,500 considerations. If the second curriculum or standard set doubles to 150 items, the number of considerations also doubles, to 15,000. It would be advantageous to provide a system or method that relieves the user of the burden of considering each possible combination of relationships, and which also ensures that relevant combinations are not overlooked.

The present invention makes this process easier, reducing the time required to complete the task, and improving the thoroughness of the completed task. The system according to the invention reduces the number of considerations that must be made in two ways: by dividing one, or both, of the curricula (or standard sets) into subsets based upon the type of material or any other criteria, and by filtering of the resulting subset based upon keywords, regular expressions, or any other arbitrary set of rules. The user of the program specifies the subset or subsets they are interested in, and also specifies terms to further reduce the number of items which must be considered.

BRIEF DESCRIPTION OF THE DRAWINGS

FIG. 1 is an illustration of a curriculum item matrix according to the prior art.

FIG. 10 is a portion of an example Academic Competency Summary report generated by software of the present invention.

DETAILED DESCRIPTION

Figure 2:
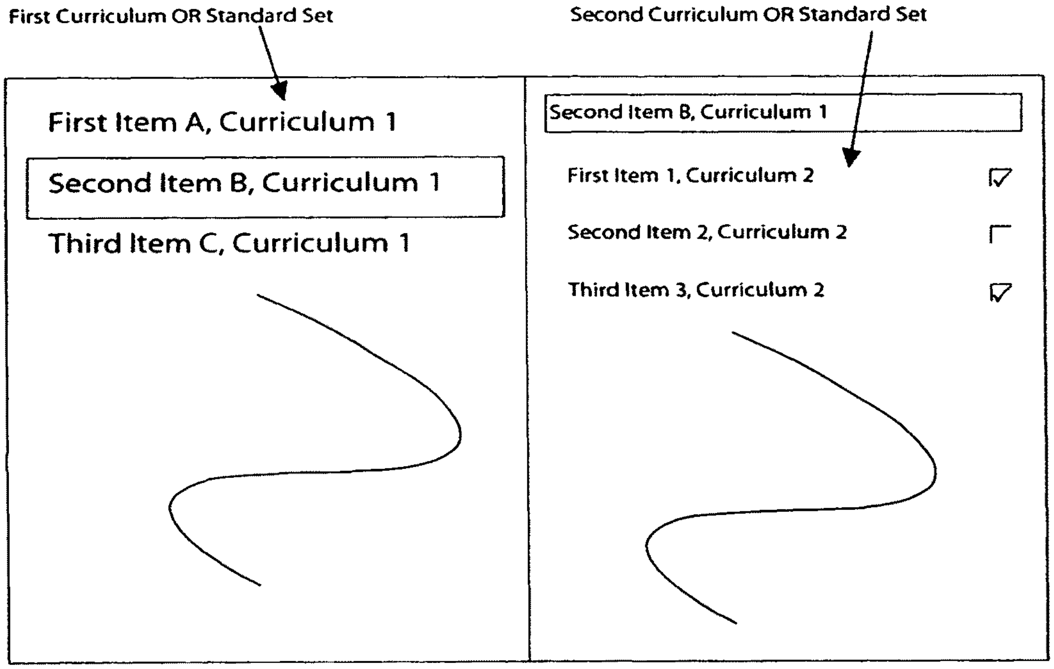
FIG. 2 is a schematic representation of a screen shot showing a prior art curriculum "crosswalk" in a side-by-side orientation.

In the preferred embodiment of the invention, the items from the first curriculum are displayed on the left hand side of the screen, and the items from the second curriculum, or set of standards, are displayed on the right hand side of the screen, as shown in FIG. 2. Alternate arrangements are possible—with one curriculum on the top of the screen, and the other displayed beneath it, as in FIG. 3. Yet another embodiment would display the first curriculum, and pop up a floating window for the second curriculum or set of standards, as in FIG. 4. The present invention achieves similar results regardless of the spatial orientation of the two curricula.

Figure 5:
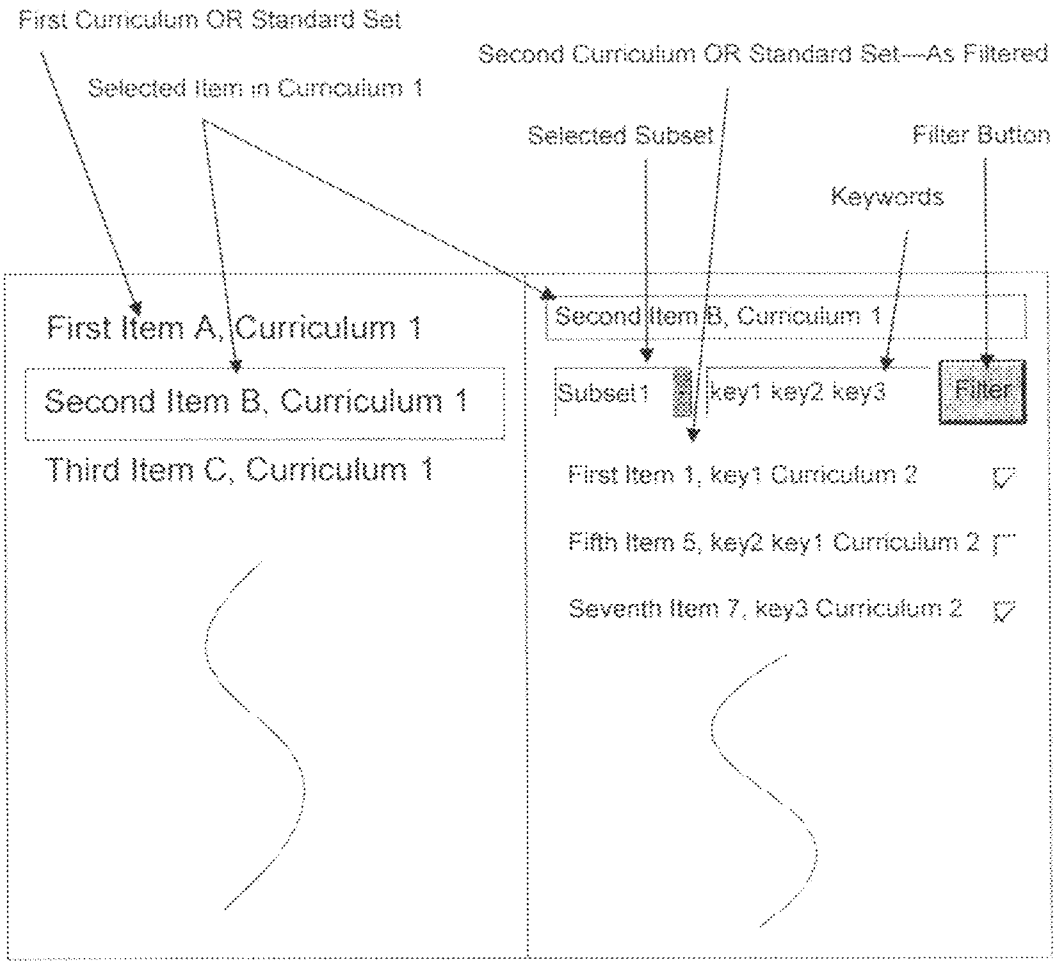
FIG. 5 is a schematic illustration of a screen shot of a side-by-side curriculum "crosswalk" utilizing the drop down menus and a filter system for selecting correlating items, according to the invention.

When one item from the first curriculum is selected, such selection will be indicated preferably according to the conventions of the underlying operating system. For instance, the selected item will display with an alternate background color, display of a checked or unchecked box, enclosure by a box, or any other suitable method devised to indicate its selection. The second curriculum screen will be updated to list the items from the second curriculum and to indicate the items from the second curriculum that correspond to the selected item in the first screen. As indicated with respect to the first screen containing items from the first curriculum, any one of a number of different techniques may be used to indicate which items from the second curriculum are selected for correspondence with the item from the first curriculum. In the preferred embodiment, as illustrated in FIG. 5, checked boxes are used to identify selected items. An item with an associated checked box indicates the item in the second panel corresponds to an item in the first. An item with an unchecked box indicates the item does not correspond. The box can be in any spatial arrangement to the item, so long as it is clear which box the item corresponds to. One alternative embodiment would be to highlight corresponding items with a contrasting color. Another embodiment would be to associate a suitable iconic indicator with the item. Any suitable indicator is acceptable.

In the preferred embodiment, the full text of each curriculum item in each curriculum panel is displayed. In the alternative, the text identifying a curriculum item could be abbreviated. Yet further, the display could include a unique alphanumeric identifier in addition to, or instead of, the full or abbreviated text identifying each curriculum item. The actual representation of the curriculum item is relevant to the extent that the user can readily recognize the curriculum item in question, and to the extent that the identifier can be contained within the screen space available.

Figure 3:
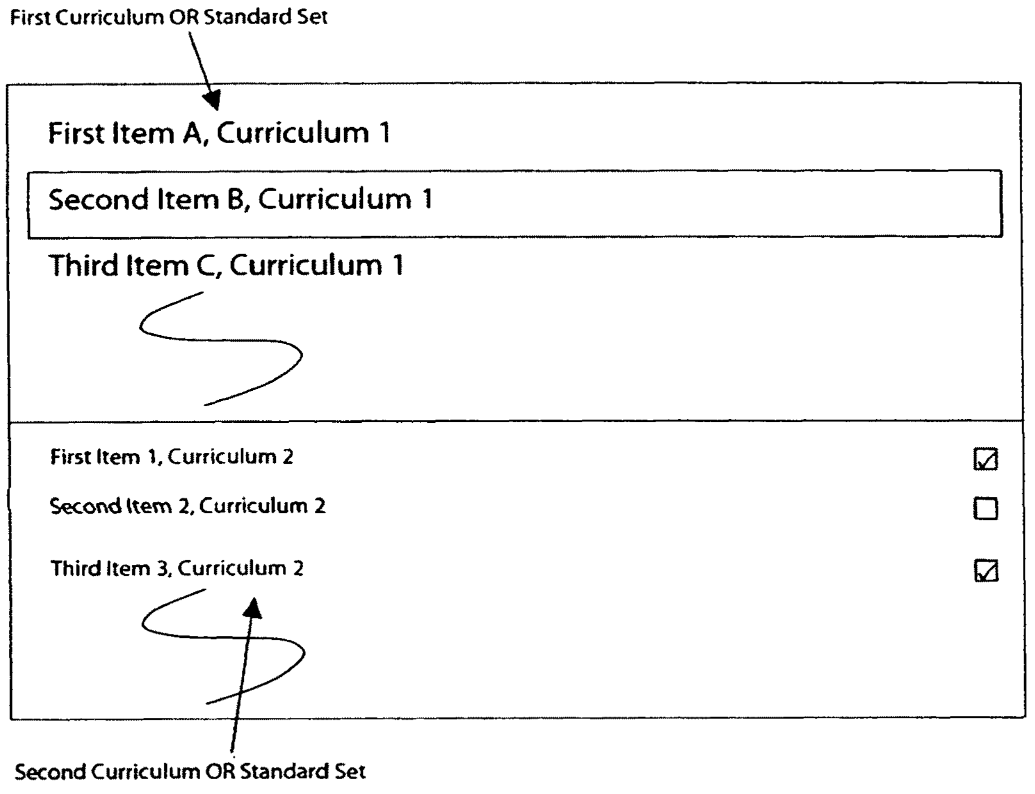
FIG. 3 is a schematic representation of a screen shot showing a curriculum "crosswalk" in an over-under representation.
Figure 4:
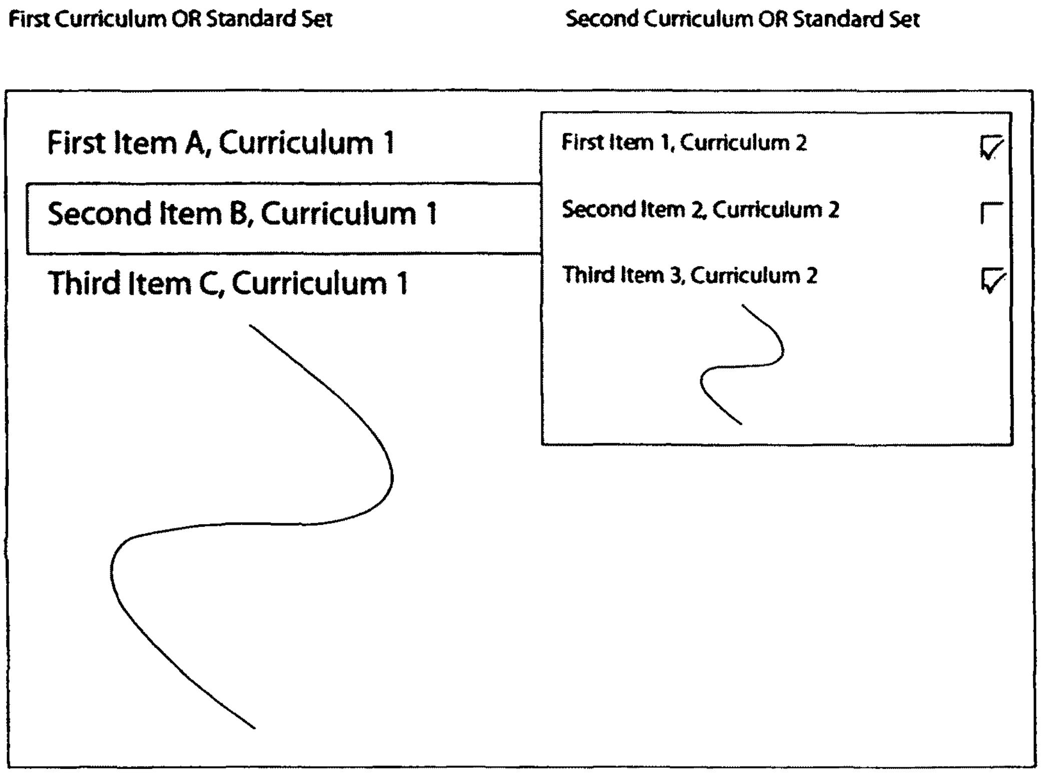
FIG. 4 is a schematic illustration of a screen shot of a curriculum "crosswalk" utilizing a pop-up window.

The previously described screens, typified by the illustrations of FIGS. 2-4, display all of the items in each curriculum or set of standards, with possible provisions made for scrolling through multiple screens, as the number of items extends beyond a single screen. The system according to the invention filters the items to be displayed in one, or both, curriculum displays. A system utilizing one or more filters for the curriculum items is illustrated in FIGS. 5-8.

Referring to FIG. 5, a first method for filtering divides the second curriculum into subsets. Such a division can be made around basic educational subjects such as: English Language Arts, Mathematics, Social Studies, and Science. Other divisions are possible, and are largely dependant on the actual curriculum or set of standards to be divided. By selecting the subset, or subsets, to be displayed, the actual items to be displayed are reduced, and the number of items to be considered when evaluating the items for potential correspondence is also reduced.

In the embodiment of FIG. 5, a drop-down list box is used to select only one of the subsets. In an alternative embodiment (not shown), more than one subset can be simultaneously selected by providing checkable boxes next to each listed subset, for example within the drop-down list, or otherwise. Yet another embodiment would provide a scrolling list with all included subsets suitably selected according to the underlying operating system conventions. It is only necessary, or sufficient, to indicate to the user which subsets are being considered, and to provide a mechanism for the user to select which subsets to consider. It is also desirable to provide a provision for automatically selecting all subsets.

Figure 6:
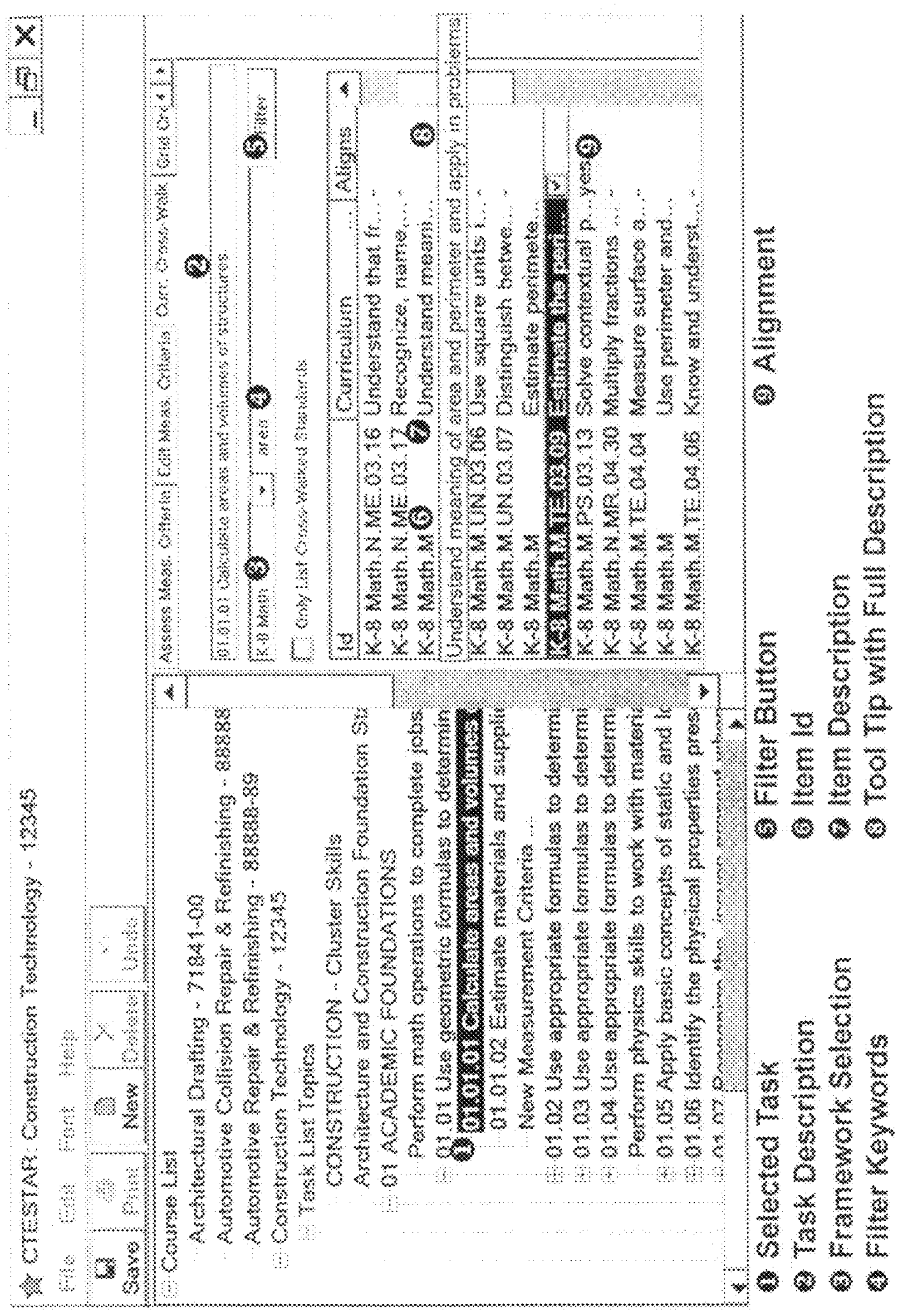
FIG. 6 is a screen shot of the current version of the CTESTAR® curriculum alignment by task, according to the invention.
Figure 7:
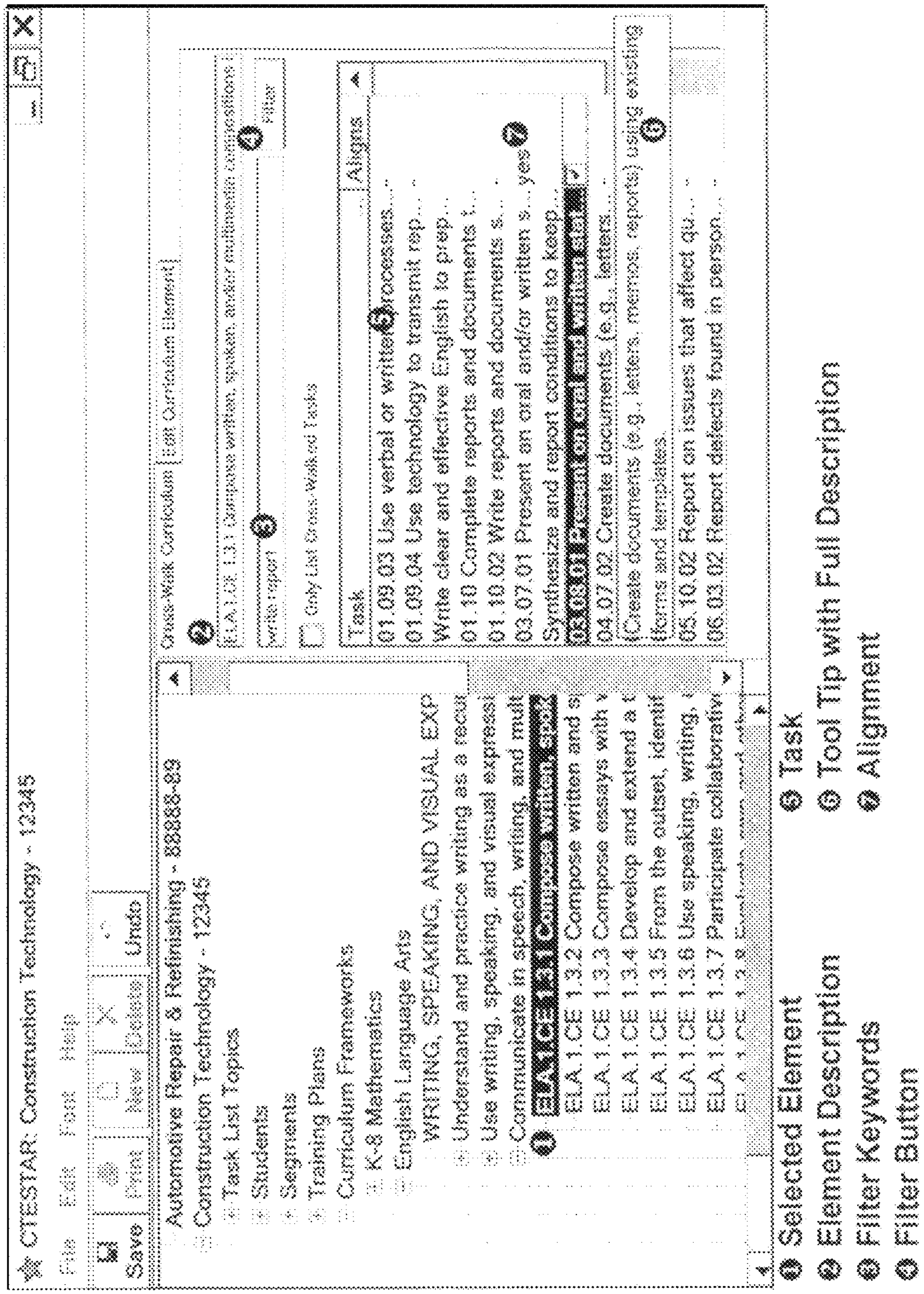
FIG. 7 is a screen shot of the current version of the CTESTAR® curriculum alignment by framework, according to the invention.

A second method for further restricting the curriculum items based upon keywords and/or partial keywords is provided, as shown in FIGS. 5-7. A field is provided for the user to enter a number of keywords, shown as key1, key2, key3 in FIG. 5. In the preferred embodiment, the text is typed into the specified field, and the curriculum items are filtered when the "Filter" button is clicked. In the alternative, the displayed items can be continuously updated as the keywords are entered. When no keywords are entered into the text box, the "filtering" results in the display of all of the second curriculum items. When this keyword filtering is combined with the previously described filtering by subset feature, as illustrated in FIG. 5, the second curriculum items will be filtered by whichever filter or filters are applied. In the preferred embodiment, the items displayed are the result of a logical "and" of the two selection mechanisms, that is, only the items that are both in the subset and which also match the keyword expression are included, although alternate embodiments with selected Boolean logic could also be used. In a further alternative embodiment of the present invention (not shown), words would be highlighted in one or both of the curricula or set of standards, and the filtering would be performed on the basis of the words so selected.

In the system described above, the keywords and partial keywords are selected to filter curriculum items that contain a match in their description for the keywords chosen. In a further embodiment of the system, keywords are attached or assigned to each of the curriculum items. A match in the keyword search could be based on these assigned keywords, alone or in combination with the contents of the description. Yet another embodiment would provide for the use of "regular expression" matching of the keywords. In another embodiment, logical expressions regarding the keywords and subset names could also be used to filter the curriculum items. The purpose of the invention is to restrict the set of curriculum items displayed, and thus reduce the time required to thoroughly consider all potential combinations of items.

Figure 8:
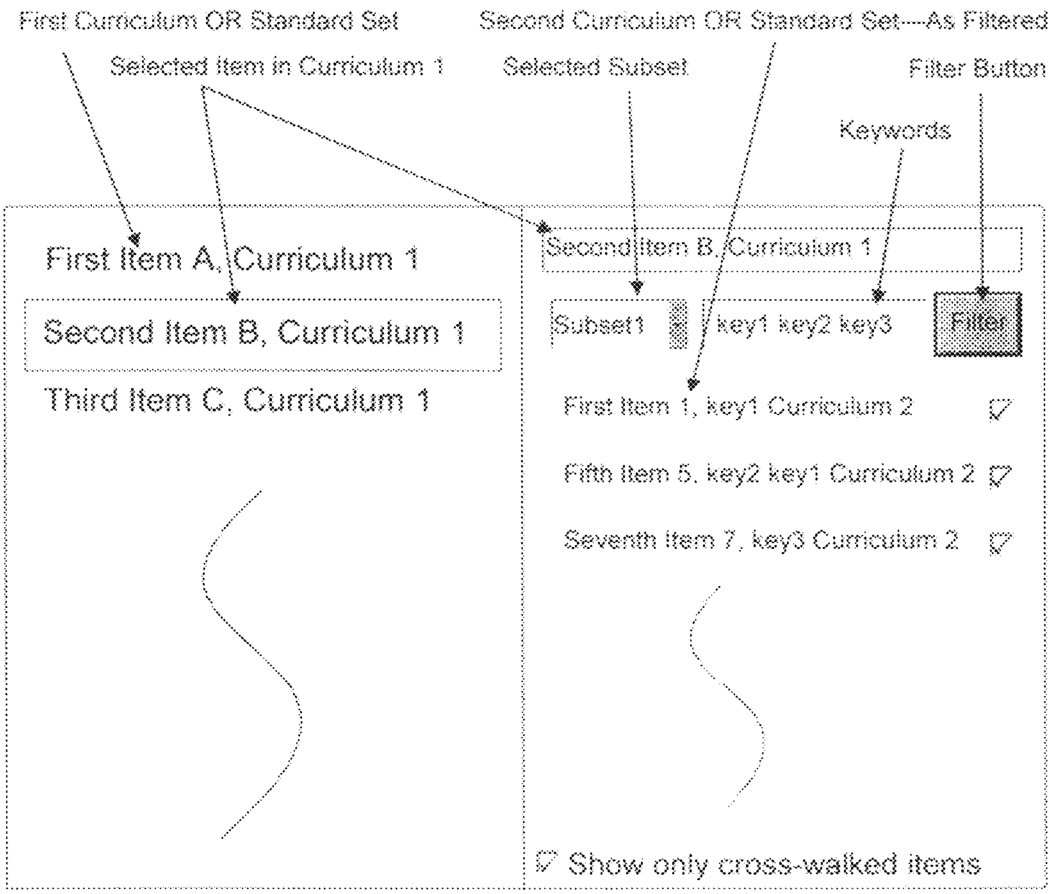
FIG. 8 is a schematic illustration of a screen shot of a side-by-side curriculum "crosswalk" utilizing the drop down menus and a filter system for selecting correlating items, according to the invention, with an additional filter to show only cross-walked items.

In a further embodiment of the invention, the display can be limited to only those second curriculum items which have already been cross-walked, as shown in FIG. 8. This can be useful to the user in bringing the cross-walked items onto fewer screens, without the clutter of non-relevant items making the list unmanageable, for the purpose of verifying the completeness of the cross-walk process.

In the preferred embodiment of the invention, as particularly shown in FIGS. 6-7, the second curriculum screen also displays the text of the selected item from the first curriculum panel. This display aids the user in comparing the restricted set of items to the selected item. After the items from the second curriculum or set of standards are appropriately displayed, the user may read through them indicating correspondence to the first curriculum through any suitable mechanism. In the preferred embodiment (see FIGS. 5 and 8), this is done through checkable boxes, however, any suitable mechanism will suffice. For example, FIGS. 6 and 7 indicate correspondence by a "yes" indicator. Once the user has considered all of the displayed items from the second curriculum or set of standards, the user may select a new item in the first curriculum. When this is done, the second curriculum or standard set display is refreshed, and the process is repeated. If necessary, the user can change the subset and/or keywords as appropriate for the newly selected item from the first curriculum, or whenever it is deemed necessary, or is convenient.

Such a correlation may also be extended to the achievements of an individual student or to a set of students. By extending such a correlation to a student or set of students, it is possible to award credit to a student for a second correlated course or academic discipline based on the student's performance in a first correlated course. An additional use of such correlated student achievements is to award credit for course work or curriculum at a different institution, whereupon the correlation of the learning objectives of a first institution are correlated with those of a second institution. The student's achievement as measured by the first institution and its set of objectives could be applied to the second institution and its set of objectives to determine which credit should be awarded at the second institution, and for which courses or curricula.

Preferably, such a correlation is based on assignments in a teacher's or professor's grade book. However, any other measure of student achievement, such as a test, quiz, or other measure of performance, also known as an assessment, could be correlated to the learning objectives of a second course or curriculum. The correlation between the first course and the second course or curriculum is calculated using a set of tasks or "class standards." Correlation between the class standards and the assessments of the first course are preferably correlated by use of a weighting factor, such that certain correlations can be deemed more important than others and a relative weight given to the correlations between the class standards and the assessments. Therefore, each assessment may be correlated to many different class standards, each with a designated weighting factor. Conversely, each class standard may be correlated to many different assessments, each having potentially different weighting factor. However, each weighting factor may be identical to one another, if so desired. If the weights are all Boolean in nature, that is, they are either related or they are not related only, the weights may be represented with any type of signaling convention suitable to display such a state, for example a check box for related versus non-related or a weight of one versus a weight of zero.

Once the correlations of the student assessments to the first course learning objectives or class standards, along with weights, have been established, it is possible to calculate a score, using an algorithm, for the learning objectives of the first course based on a weighted average of the student assessments correlated to each learning objective. Alternatively, any other suitable algorithm or factors may be used to calculate the scores based on the student assessments.

Once the scores for the learning objectives of the first course have been calculated, these scores may be projected to a second course through an established correlation between the learning objectives of the first course and the learning objectives of the second course by use of the class standards. As with the first course, the calculation may be performed by use of a weighted average, or any other suitable algorithm or factors, correlating one or more class standards to the second course and its objectives. The calculation results in one or more scores for the second class, or for objectives for the second class, for a given student. These results, preferably in the form of scores, are displayed through a generated report, either electronically such as on a computer screen, or in hard copy format. The learning objectives of the first course upon which the scores are based for the second course, may also be displayed in the report, along with any weighting factors used. The assessments may be also displayed in the report, or various combinations of the class standards, assessments, and correlations may be displayed, depending on the desire of the given academic institution or instructor. The results, in the form of scores for the learning objectives of the second course, are then used to determine whether a given student is entitled to credit for the second course, or alternatively another academic discipline, based on the skills and grades of the first course.

Other data may be used to calculate the score for the second course. One set of data that may be used is a non-graded assessment. The non-graded assessment is typically used in the calculation for the final score; in other words, it is not ignored, but a grade is not associated with it. Yet another set of data that may be used is one or more exempt assessments. The data for the exempt assessment is typically not used in the calculation of the final score; in other words, the data is ignored in the calculation. In the exempt case, the instructor is basically saying that a student assessment on the learning objective is not required, hence the final score should not be adversely affected. In the non-graded case, the missing assessment may have significance, and therefore the final score may be affected.

The report, which may be in the form of a summary or detailed report, preferably includes statistics related to the calculated scores of the learning objectives from the first course that are related to those in the second course or discipline. Such statistics may include, but are not limited to, the final score, average scores, total score, and standard deviation. The statistics may also depict the scores of the correlated second course learning objectives, the learning objectives of the original student assessments, or a combination of all three types of data.

Another set of data that may be used is the definition of "rules." A rule specifies a pattern of correlations between a repeated assessment and a set of learning objectives, as one of the features of many courses is the notion of repeated assignments. Such a rule has at least two parts: first, a description of assessments that will match the rule, and second, correlations and weights that will automatically be applied to all the assessments matching the particular rule. The specification of a rule reduces the work required to correlate two distinct sets of learning objectives and condenses the reported learning objective scores, as the repeated assessment may be condensed to a single summarized entry.

Another set of data that may be used in the correlation algorithm relates to a way in which external student assessments in a different academic system are correlated to the first course learning objectives. In the event that it is necessary to correlate course objectives to an external database, such as an external grade book implemented by another company or another system, indicator codes may be incorporated. Such indicator codes may be incorporated within the assessment description in the external grade book. An example of indicator codes is text contained between an introducer character, such as a left square bracket, and a terminator character, such as a right square bracket, for example: [HOSPZ:Appetizers Lab, PA, WA]. Other introducer characters, terminator characters, or combinations of characters may be used. The assessment descriptions are typically editable by a teacher or instructor and therefore it is possible for the teacher to create an identifier for the assessment by embedding certain text identifying the assessment between the end indicator code characters, such as the brackets. By using identical indicator codes in different grade books, it is possible to correlate multiple assessments in different grade books to the same set of first course learning objectives.

When correlating multiple external assessments or tasks from multiple external grade books, students, assessments, and grades from different courses may all be combined into a single course or curriculum. By keeping track of the number of assessments that have been mapped to the database entry, it is also possible to assist the teacher or instructor to ensure that the data has been correctly mapped, and that the students in the various courses are all being assessed against an identical set of assessments. Furthermore, using such information, it is possible to assist the teacher in correcting any correlation errors that may occur.

Figure 9:
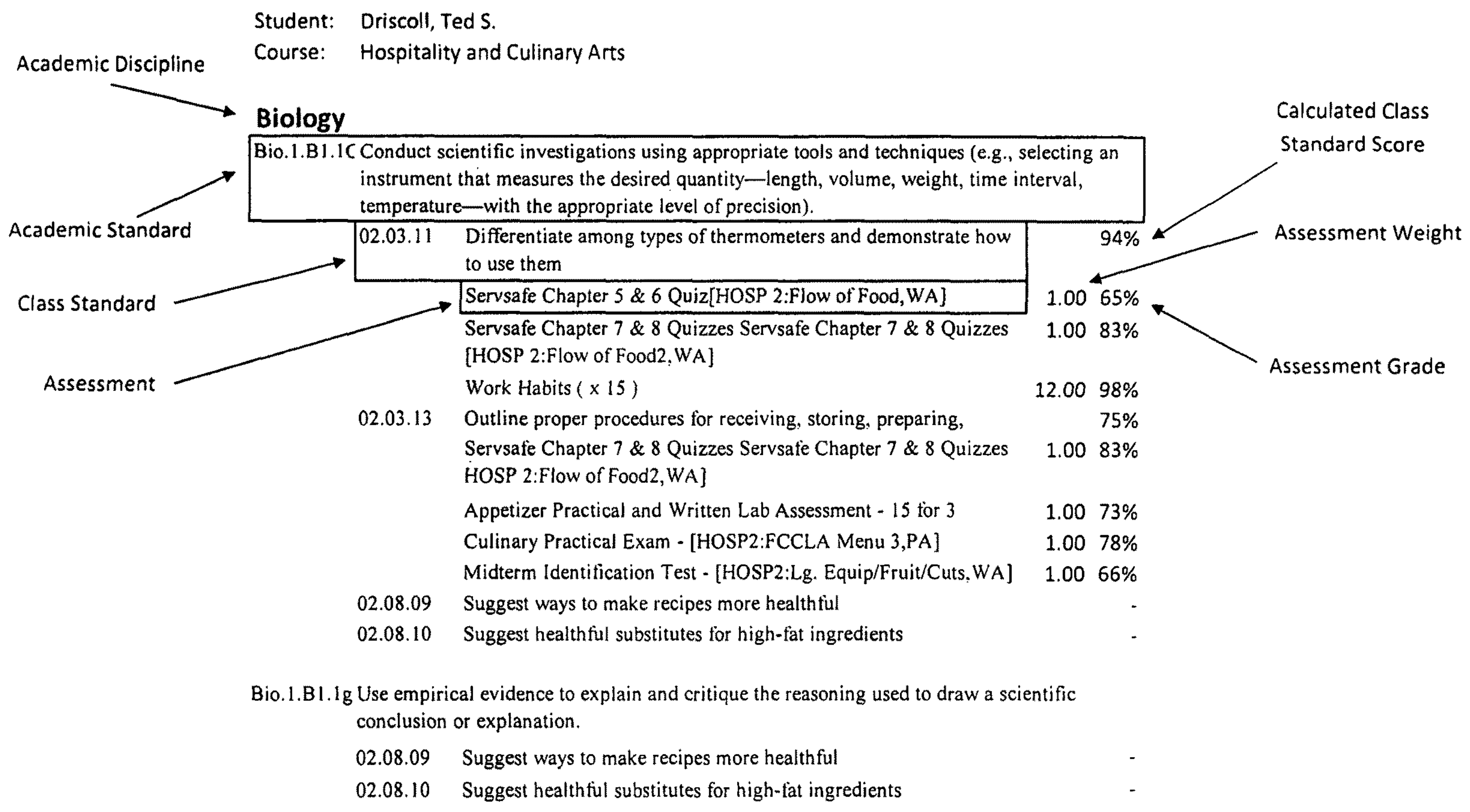
FIG. 9 is a portion of an example Academic Competencies report generated by software of the present invention.

Various types of reports may be generated using the above correlations of data. Following is a list of examples of reports that may be generated:

Academic Competencies: This report depicts the relationships between a particular set of academic standards and a calculated score for a class standard based upon correlated assessments and associated grades from a first course or curriculum. Weighting factors may be shown, as well as assessed and calculated percentages. See FIG. 9 for an example of a portion of such an Academic Competencies report.

Academic Competency Summary: This document summarizes statistics for a particular second course or academic discipline for all of the students in a first class. See FIG. 10 for an example of a portion of such an Academic Competency Summary report.

Figure 11:
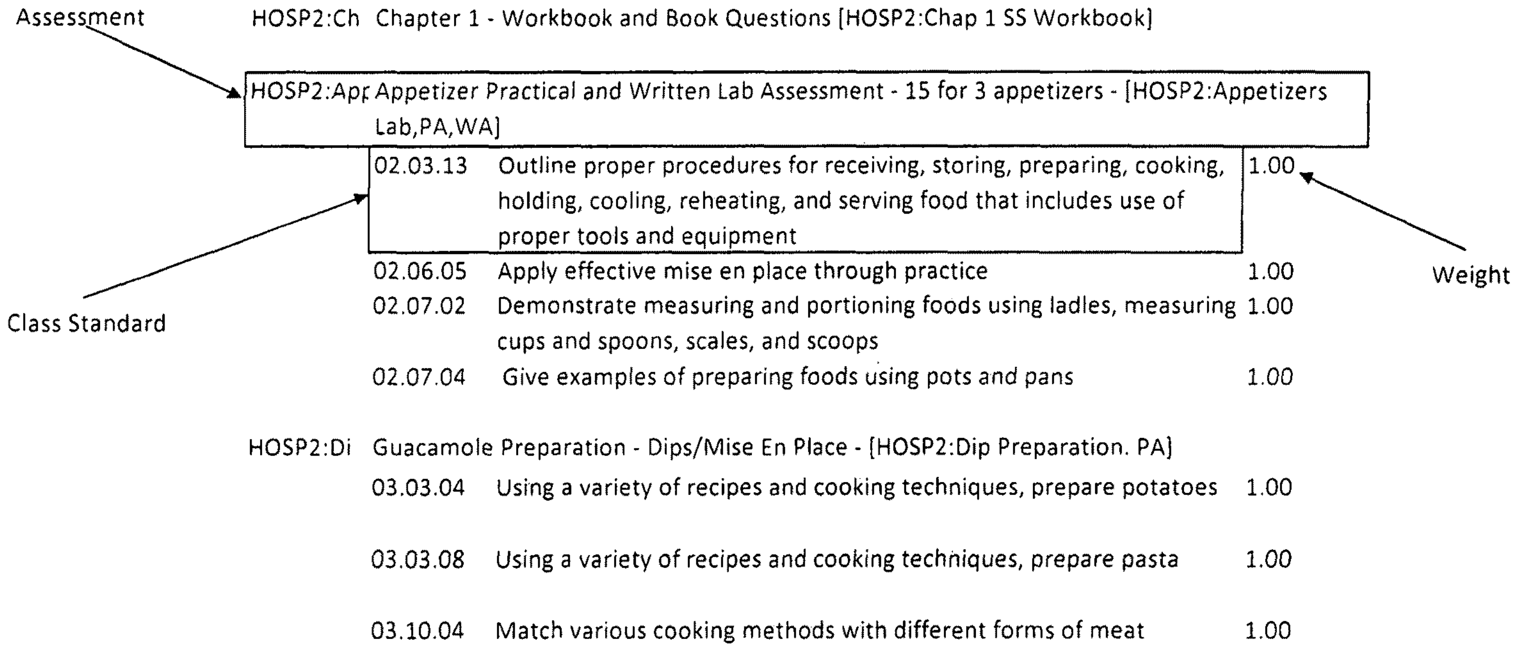
FIG. 11 is a portion of an example Course Assignment Crosswalk report generated by software of the present invention.

Course Assignment Crosswalk: This report shows the correlation between student assessments and class standards. Each student assessment is listed, along with the associated class standards and weighting factors. See FIG. 11 for an example of a portion of such a Course Assignment Crosswalk report.

Figure 12:
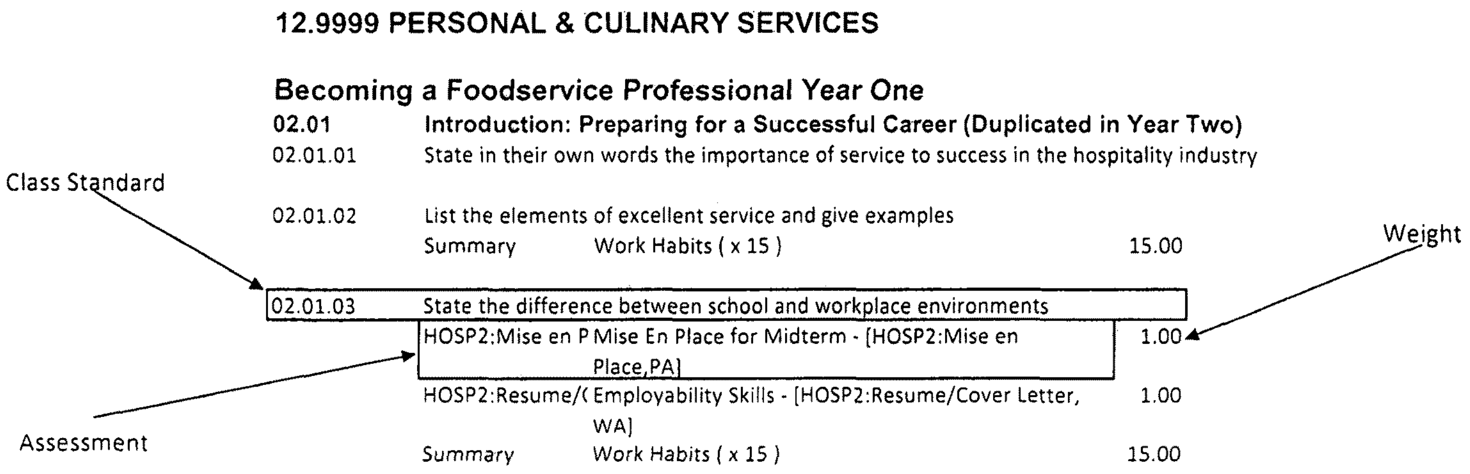
FIG. 12 is a portion of an example Course Assignment Crosswalk By Task report generated by software of the present invention.

Course Assignment Crosswalk By Task: This report shows the correlation between class standards and student assessments, along with associated weighting factors. Each learning objective is listed, as well as student associated assessments and weighting factors. See FIG. 12 for an example of a portion of such a Course Assignment Crosswalk By Task report.

Figure 13:
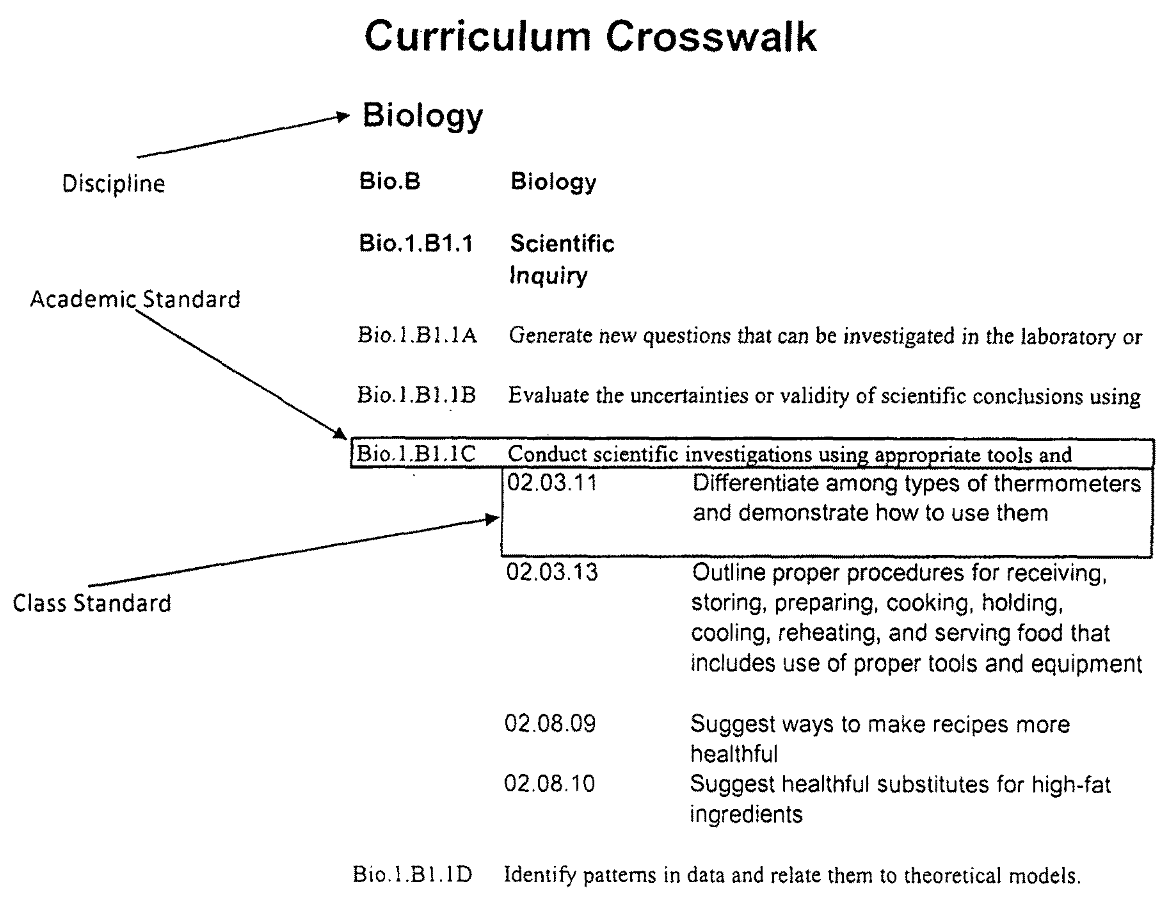
FIG. 13 is a portion of an example Course Curriculum Crosswalk report generated by software of the present invention.

Course Curriculum Crosswalk: This report shows the correlation between second course standards, or "academic standards" and class standards. Each of the academic standards is listed, along with any associated class standards. See FIG. 13 for an example of a portion of such a Course Curriculum Crosswalk report.

Course Curriculum Crosswalk By Task: This report shows the correlation between first course learning objectives and second course learning objectives. Each of the first course learning objectives is listed, along with any associated second course learning objectives, by task.

Figure 14:
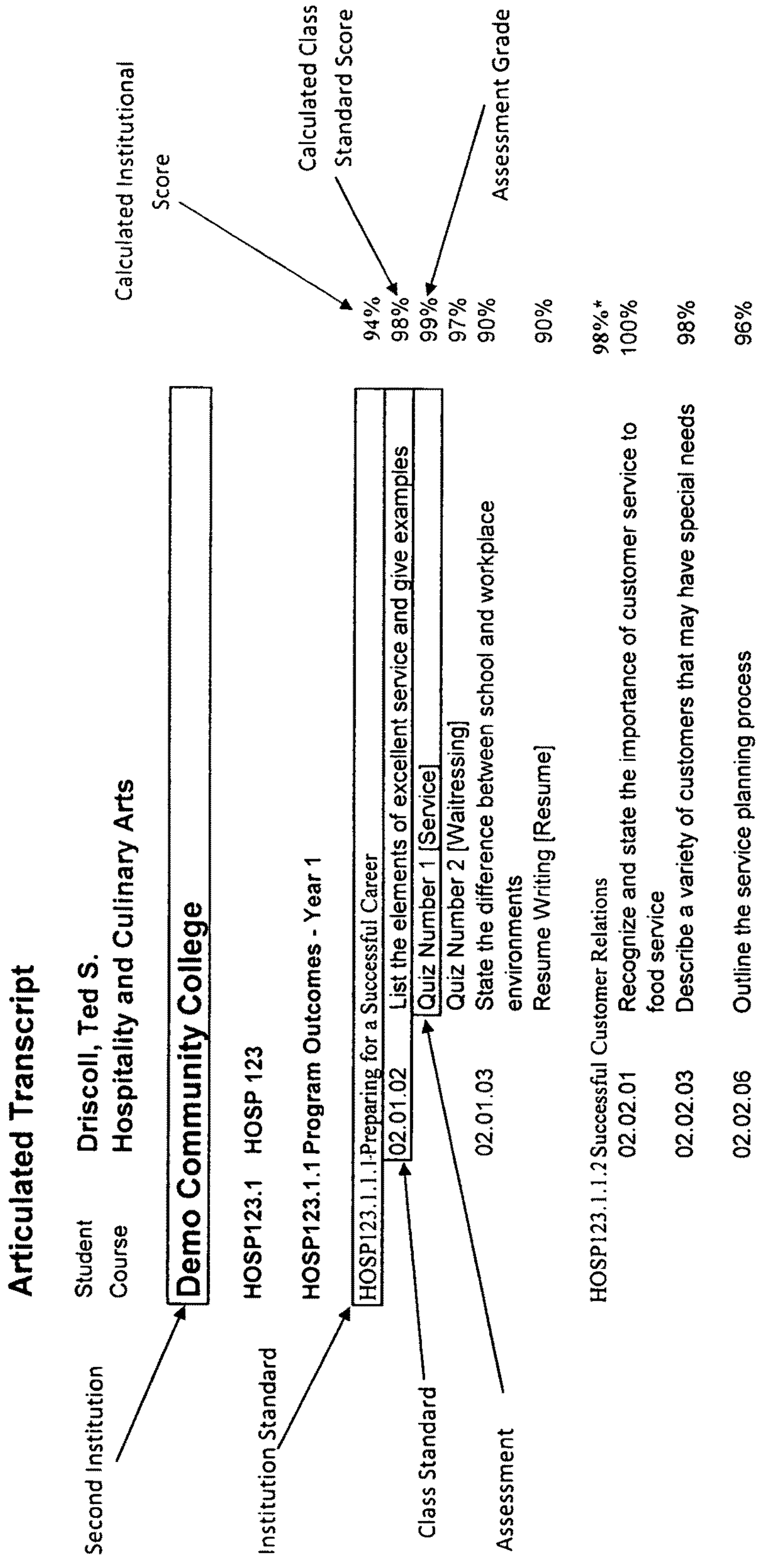
FIG. 14 is a portion of an example Articulated Transcript report generated by software of the present invention.

Articulated Transcript: This report illustrates the assessments and class standards of a first course correlated to the academic standards of a second course, such as that at a community college. The scores for assessments and class standards of the first course are also displayed. See FIG. 14 for an example of a portion of such an Articulated Transcript report.

Although the present invention addresses establishing the correspondence between two standards or objectives, or correlation among assessments, class standards, and academic standards, it generally applies to establishing a correspondence between any two or more arbitrary sets of items.

Although particular preferred embodiments of the invention have been disclosed in detail for illustrative purposes, it will be recognized that variations or modifications of the disclosed apparatus and methods, including the rearrangement of parts or steps thereof, lie within the scope of the present invention.

What is claimed is:

1. A method of correlating achievements of a student from a first academic course to at least one learning objective of a second academic course for determining course credit in the second academic course from the achievements in the first academic course, the method comprising the steps of:

providing a data processing machine having software installed thereon;

providing a first learning objective for the first academic course;

providing at least one assessment for the first academic course which is correlated to the first learning objective of the first academic course;

providing a second learning objective of the second academic course which may be correlated with the first learning objective of the first academic course;

determining a first score for the assessment for a predetermined student;

using the software on the data processing machine to perform the following steps:

(a) weighting the at least one assessment relative to other assessments for the first learning objective of the first academic course, (b) weighting the first learning objective of the first academic course relative to other first academic course learning objectives for correlation of the weighted first learning objective of the first academic course to the second learning objective of the second academic course, (c) determining at least one second score for the first learning objective of the first academic course based on the first score for the at least one assessment and the relative weighting of the at least one assessment associated with the first learning objective of the first academic course, (d) determining a third score for the second learning objective of the second academic course to correlate the weighted first learning objective to the second learning objective, the third score being based on the at least one second score for the first learning objective of the first academic course and the relative weighting of the first academic course learning objective, and (e) generating a report based upon the third score for the second learning objective of the second academic course for the student; and evaluating the third score of the second learning objective to determine whether the student is entitled to credit for the second academic course.

2. The method of claim 1, wherein a plurality of assessments are correlated to the first academic course learning objective.

3. The method of claim 2, wherein the assessment is correlated to a plurality of first academic course learning objectives.

4. The method of claim 1, wherein the report comprises data depicting the relationship between the assessment first score and the third score of the second learning objective of the second academic course.

5. The method of claim 1, wherein the weighting of the at least one assessment is a Boolean weighting.

6. The method of claim 1, wherein the third score for the second learning objective is based on the second score for the first learning objective and relative weighting of a plurality of first academic course learning objectives.

7. The method of claim 1, wherein the first academic course is at a first institution, and the second academic course is at a second institution, the first institution being different from the second institution.

8. The method of claim 1, further comprising the step of providing an indicator code for each assessment.

9. The method of claim 1, wherein the report comprises data depicting relationship between the second score for the first academic course learning objective and the third score for the second academic course learning objective.

10. The method of claim 1, wherein the report comprises data depicting relationship among the assessment first score, the second score for the first academic course learning objective, and the third score for the second academic course learning objective.

11. The method of claim 1, wherein the report comprises data depicting relationship between the assessment first score and the second score for the first academic course standard.

12. The method of claim 1, wherein the third score for the second academic course learning objective is based on the second score for the first academic course learning objective and relative weighting of a first academic course learning objective associated with a plurality of second academic course learning objectives.

13. The method of claim 1, wherein a plurality of first academic course learning objectives are correlated to the second academic course learning objective.

14. The method of claim 13, wherein the first academic course learning objective is correlated to a plurality of second academic course learning objectives.

15. The method of claim 1, wherein the weighting of the first learning objective for the first academic course for correlation to the second learning objective of the second academic course is a Boolean weighting.

16. The method of claim 1, wherein the second academic course represents an alternative set of academic standards for a different academic discipline.

* * * * *